April 6, 1943.  E. G. REESE  2,316,019
DEVICE FOR TESTING FLUIDS
Filed Aug. 29, 1941  2 Sheets-Sheet 2

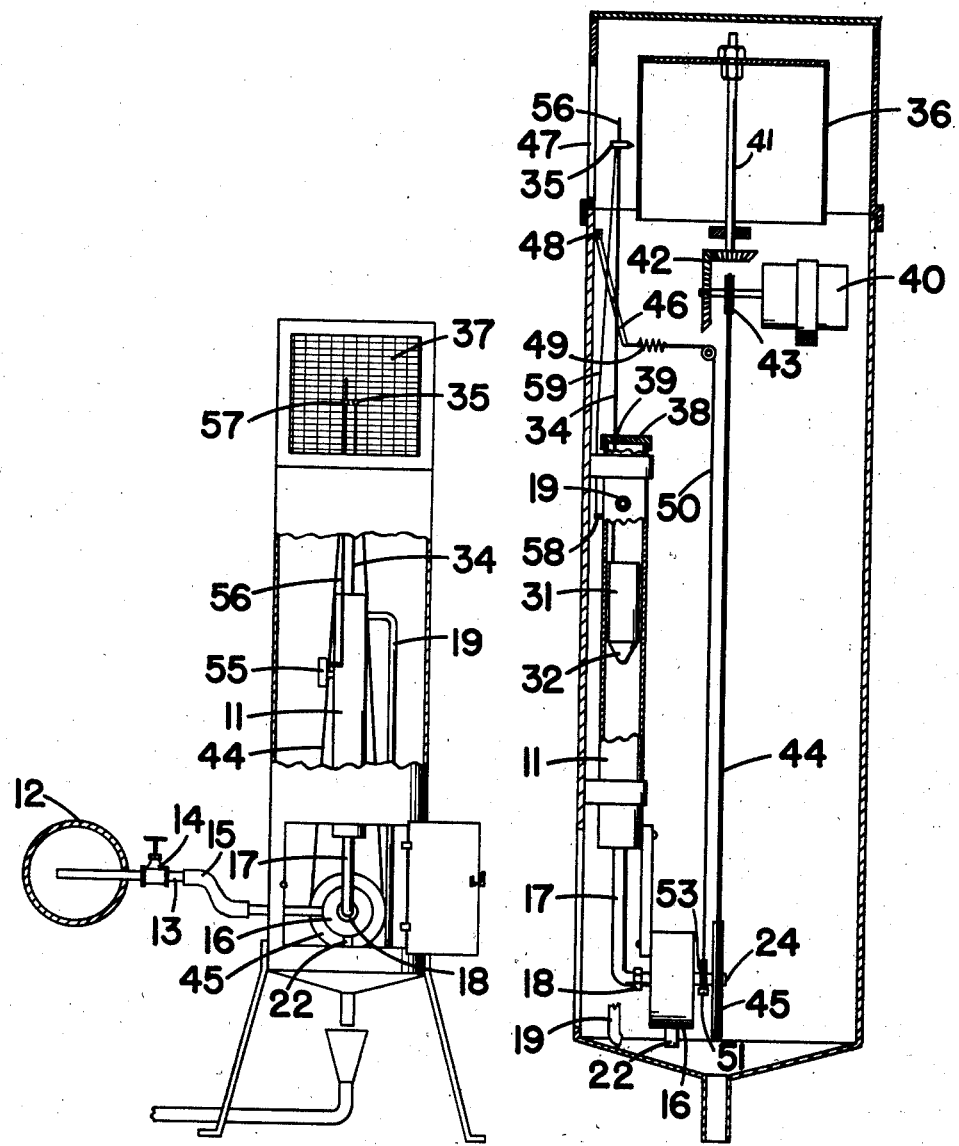

Edgar G. Reese INVENTOR.
BY J. G. McKean
ATTORNEY

Patented Apr. 6, 1943

2,316,019

UNITED STATES PATENT OFFICE 2,316,019

DEVICE FOR TESTING FLUIDS

Edgar G. Reese, Junction, Tex.

Application August 29, 1941, Serial No. 408,728

5 Claims. (Cl. 265—2)

The present invention is directed to a device for taking and testing samples of fluid.

When fluids are being conveyed in a stream, such as by flow through a pipe line, it is frequently desirable to determine physical characteristics of the fluid passing a certain point at frequent intervals. One of the most pressing problems in this field is the determination of the specific gravity or density of oil being conveyed through a pipe line. The specific gravity of petroleum oil changes considerably with the temperature and it is accordingly desirable to obtain the temperature of the oil concurrently with its specific gravity so that the reading of the specific gravity may be properly corrected for temperature variations.

It is accordingly an object of the present invention to devise a means for determining the specific gravity of liquids.

A further object of the present invention is to devise a means capable of removing at frequent intervals samples of fluid from a stream flowing through a conduit and determining the specific gravity and temperature of each sample.

Other objects and advantages of the present invention may be seen from a reading of the following description taken in conjunction with the drawings in which—

Fig. 1 is a front elevation, partly in section, of an embodiment of the present invention;

Fig. 2 is a side elevation, partly in section, of the device shown in Fig. 1;

Figure 3:
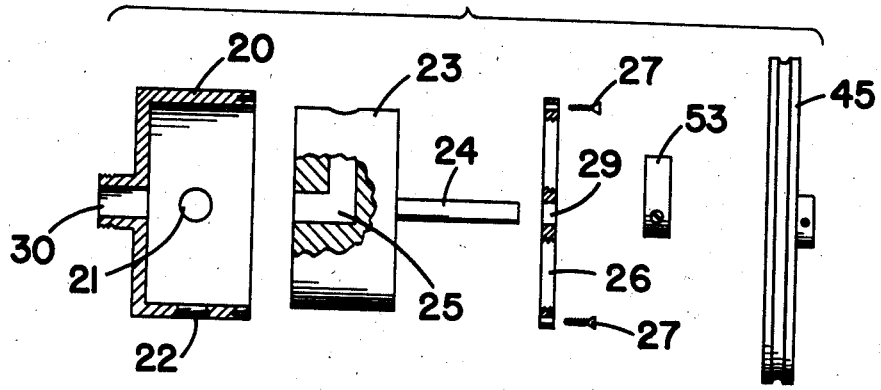
Fig. 3 is a fragmentary view illustrating in greater detail the valve controlling the flow of fluid from the conduit into the device.
Figures 4, 5:
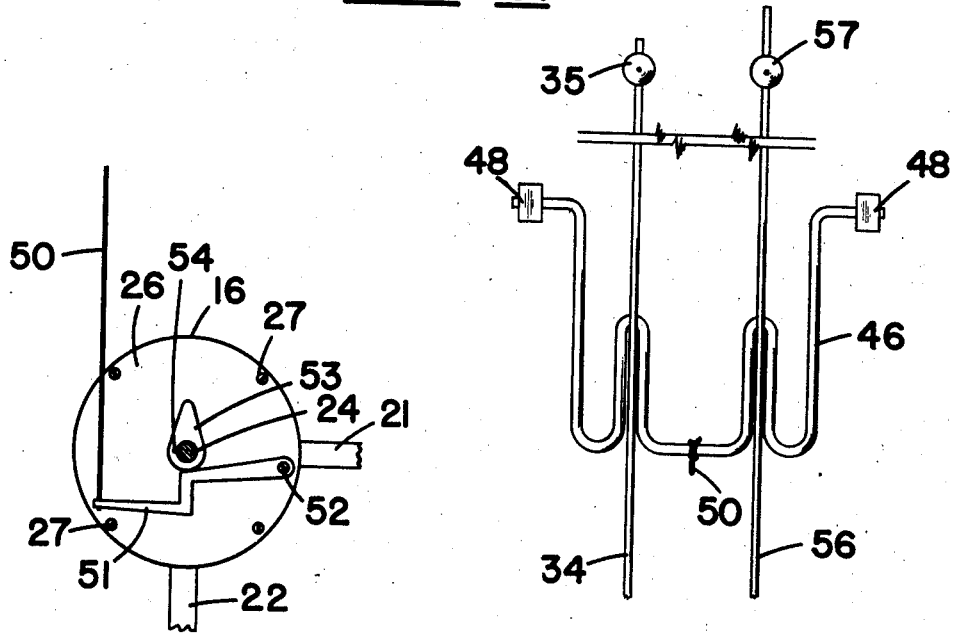
Fig. 4 is a fragmentary view showing in greater detail a portion of the means operating the recording mechanism.
Fig. 5 is another view of a portion of the mechanism for operating the recording means.

Referring specifically to the drawings, a cylindrical vertically arranged sample container 11 has its lower portion fluidly connected to large pipe line 12. The connecting means includes pipe 13, hand-operated valve 14, flexible tubing 15, mechanically operated valve 16, and pipe 17 provided with union 18. From the upper portion of sample container 11 an overflow conduit 19 is provided.

Mechanically operated valve 16 comprises a casing 20 provided with an inlet 21 and an outlet 22 at right angles to the inlet. The interior of the casing is provided with a circular opening adapted to receive movable member or rotor 23. Member 23 is provided with a circular periphery arranged to fit snugly within the opening of valve body 20 and is provided with a shaft 24 for operation of the valve as will be hereafter explained. Member 23 is provided with an L-shaped passage 25, the passage extending radially from the periphery of the rotor to the center thereof, then making a right angle turn and extending along the axis of the drive shaft, but in an opposite direction to the shaft of the rotor. Casing 20 is provided with a suitable cover 26 secured to the casing by suitable means, such as cap screws 27, and provided with a central opening 29 to allow the passage of shaft 24. An additional passage 30 is provided in the casing to allow communication between the central portion of passage 25 and pipe 17 connecting the valve body to the sample container.

Arranged within container 11 is elongated float 31 having an end 32 weighted in order that the float will retain its upright position when in fluid. Attached to the upper end of float 31 and extending upwardly in a direction parallel with the axis of the float is an elongated flexible member 34. The upper end of this member is provided with a pin 35 arranged adjacent drum 36 adapted to carry chart 37. Container 11 is provided with a cap 38 in which is a suitable opening 39 to allow member 34 to move longitudinally thereto, but serves to prevent undue movement of the float 31 when a record of the position of the float is made as will be hereafter described.

Clock 40 is arranged to rotate drum 36 about a vertically arranged shaft 41 through suitable gears 42. A pulley 43 is also secured to the driving mechanism of the clock and is provided with a belt 44 arranged to drive pulley 45 which is secured to shaft 24 of valve 16.

It will be evident that pulley 45 causes a sample to be admitted into chamber 11 from pipe line 12, the rotation of the pulley causing rotor 23, in turn, to rotate. When the peripheral opening leading to passage 25 is opposite inlet 21, fluid will flow from pipe line 12 into container 11. The sizes of the openings are proportioned so that passage 25 mates with inlet 21 for a sufficient period to slightly more than completely fill container 11, thereby insuring that any sample left from the previous reading is displaced. The rotation of member 23 thereupon severs the fluid connection between pipe line 12 and container 11, and allows the sample within the container to remain quiescent for a short period of time. The continued rotation of unit 23 subsequently brings the passage 25 adjacent discharge 22, causing the sample in container 11 to be withdrawn from the container preparatory to the receipt of another sample upon the continued movement of unit 23.

As a sample is run into and discharged from container 11 with each rotation of member 23, the speed of the rotation of this member is adjusted in accordance with the frequency it is desired to test the fluid flowing through pipe line 12. It will generally be desirable to test the sample at frequent intervals, such as every five or ten minutes, and accordingly the driving mechanism from the clock to member 23 will be adjusted for such a speed of rotation. On the other hand, drum 36 will move comparatively slowly, as usually a complete rotation every 24 hours will be desirable. Gears 42 will accordingly be properly proportioned with the driving mechanism to obtain such a rotation.

During the interval that the sample is quiescent within container 11, a record of the specific gravity of the sample is produced on chart 37. The means for making this record includes lever 46 attached to the frame 47 of the device through pivot 48, spring 49, string or wire 50, lever 51 attached to valve 16 by cap screw 52 and cam 53 secured to shaft 24 through suitable means, such as key 54. Cam 53 is secured to shaft 24 so that it rotates with the rotor 23 of valve 16, and will come in contact with lever 51 after a sample has been trapped in container 11 and it has had time to assume a quiescent state. Contact of cam 53 with lever 51 pushes the lever downwardly and this movement is transmitted through string 50 to lever 46. The end of lever 46 is pulled outwardly and forces the tip of pen 35 against chart 37, thereby indicating the specific gravity of the fluid within container 11. Spring 49 is arranged in the force transmitting means to prevent the exertion of an excessive force against pen 35.

The specific gravity of any fluids, for example, petroleum constituents, varies substantially with the temperature and it is therefore desirable to indicate the tempertaure of each sample simultaneously with its specific gravity. Accordingly, a temperature responsive means 55 which may, for example, be a bimetallic strip, is attached to container 11 and arranged for thermal contact with the sample in the container. Flexible members 56 are arranged parallel to and adjacent with flexible member 34, and sliding thereon is pen 57. Lever arm 58 attached to the temperature responsive means 55 is linked to pen 57 through a suitable flexible member 59. Members 56 are arranged to be operated by lever arm 44 simultaneously with member 34. It will accordingly be seen that the position of pen 57 along members 56 is controlled by thermally responsive member 55 and that the temperature of the sample is recorded at the same time as is its specific gravity.

While I have disclosed a specific embodiment of the present invention, it will be apparent that various changes may be made by a skilled workman without involving invention, and it is my intention to embrace such changes in the hereto appended claims.

The present invention having been thus described and illustrated, what is claimed as new and useful and is desired to be secured by Letters Patent is:

1. A specific gravity indicating device comprising, in combination, a container, means arranged for periodically admitting fluid samples to said container, and for withdrawing them, a member in said container arranged for vertical movement therein and for assuming a vertical position which is a function of the specific gravity of a sample in the container, a marking device carried by said member, a thermally responsive member arranged for thermal contact with the sample in said container, a marking device arranged for movement by said thermally responsive device, a chart arranged adjacent said marking means and means arranged to bring said marking means in contact with said chart during the interval the fluid sample is in said container.

2. A specific gravity indicating device comprising, in combination, a chamber, an elongated float member arranged in said chamber having attached thereto a flexible member parallel with its longitudinal axis and carrying a marking means, a mechanically operated valve arranged to periodically admit a sample into said chamber, retain it therein an interval of time, and subsequently withdraw it from said chamber, a recording chart arranged adjacent said marking means, and means arranged to force the marking means against said chart during the period the sample is retained in said chamber.

3. A device in accordance with claim 2 in which a thermally responsive means is arranged for thermal contact with the fluid in said chamber and linked to a marking means arranged to be operated simultaneously with the marking means carried by said float.

4. A specific gravity indicating means comprising, in combination, a chamber, a valve fluidly connected to said chamber, said valve comprising a rotatable member arranged to admit a fluid sample to said container, retain it therein during an interval of time and withdraw it during each rotation, a float member in container, an elongated flexible member carried vertically by said float member and having attached thereto a marking means, a drum carrying a chart arranged adjacent said marking means, means arranged for moving said chart and rotating said rotatable valve member, and means arranged to press said marking means against said chart upon every rotation of said valve member during the interval said sample is retained in the container.

5. A device in accordance with claim 4 in which a temperature responsive means is arranged for thermal contact with the fluid in said container and mechanically connected to marking means for operation simultaneously with the previously mentioned marking means.

EDGAR G. REESE.